(12) United States Patent
Rote et al.

(10) Patent No.: US 8,922,147 B2
(45) Date of Patent: Dec. 30, 2014

(54) QUIET MOTOR CONTROL SYSTEM

(71) Applicant: Texas Instruments Incorporated, Dallas, TX (US)

(72) Inventors: John K. Rote, Allen, TX (US); Brian L. Schmidt, Sachse, TX (US); Gregory E. Swize, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 13/874,874

(22) Filed: May 1, 2013

(65) Prior Publication Data
US 2013/0241453 A1    Sep. 19, 2013

Related U.S. Application Data

(62) Division of application No. 12/765,854, filed on Apr. 22, 2010, now Pat. No. 8,493,010.

(60) Provisional application No. 61/171,695, filed on Apr. 22, 2009.

(51) Int. Cl.
  *H02P 6/10*    (2006.01)

(52) U.S. Cl.
  CPC ........................ *H02P 6/10* (2013.01)
  USPC ..................... 318/400.23; 318/432

(58) Field of Classification Search
  CPC ........................................ H02P 6/10
  USPC ............................ 318/400.23, 432
  See application file for complete search history.

(56) References Cited

U.S. PATENT DOCUMENTS

| | | | | |
|---|---|---|---|---|
| 4,761,599 A | * | 8/1988 | Yasunobu et al. | 318/723 |
| 5,155,671 A | * | 10/1992 | Inaba et al. | 363/37 |
| 6,040,673 A | * | 3/2000 | Isomura et al. | 318/615 |
| 6,236,174 B1 | * | 5/2001 | White | 318/400.35 |
| 6,307,336 B1 | | 10/2001 | Goff et al. | |
| 6,653,829 B1 | * | 11/2003 | Henry et al. | 324/207.21 |

* cited by examiner

*Primary Examiner* — Erick Glass
(74) *Attorney, Agent, or Firm* — Alan A. R. Cooper; Frederick J. Telecky, Jr.

(57) ABSTRACT

A quiet motor control system is described. This system digitally determines modulated voltages applied to motor phases in a manner that compensates for winding torque distortions, which reduces acoustic emissions.

5 Claims, 8 Drawing Sheets

QUIET MOTOR CONTROL SYSTEM

CROSS REFERENCE TO RELATED APPLICATION(S)

The present application is a divisional of U.S. Nonprovisional patent application Ser. No. 12/765,854, filed Apr. 22, 2010, which claims priority to jointly owned U.S. Provisional Application corresponding to application No. 61/171,695 entitled "Power Control System for Driving a 3 Phase Motor." This provisional application was filed on Apr. 22, 2009.

DESCRIPTION OF RELATED ART

With the evolution of electronic devices, there is a continual demand for enhanced speed, capacity and efficiency in various areas including electronic data storage. Motivators for this evolution may be the increasing interest in video (e.g., movies, family videos), audio (e.g., songs, books), and images (e.g., pictures). Hard disk drives have emerged as one viable solution for supplying high capacity storage by effectively reading and writing data from an associated magnetic media. As the densities of magnetic media increases, writing and reading data effectively becomes pivotal, which means that effective operation of the motors that send the magnetic disks becomes increasingly important. Consequently, there remain unmet needs relating to control systems for motors within data storage devices.

BRIEF DESCRIPTION OF THE DRAWINGS

The quiet motor control system may be better understood with reference to the following figures. The components within the figures are not necessarily to scale, emphasis instead being placed upon clearly illustrating the principles of the invention. Moreover, in the figures, like reference numerals designate corresponding parts or blocks throughout the different views.

While the quiet motor control system is susceptible to various modifications and alternative forms, specific embodiments have been shown by way of example in the drawings and subsequently are described in detail. It should be understood, however, that the description herein of specific embodiments is not intended to limit the quiet motor control system to the particular forms disclosed. In contrast, the intention is to cover all modifications, equivalents, and alternatives falling within the spirit and scope of the quiet motor control system as defined by this document.

DETAILED DESCRIPTION OF EMBODIMENTS

As used in the specification and the appended claim(s), the singular forms "a," "an" and "the" include plural referents unless the context clearly dictates otherwise. Similarly, "optional" or "optionally" means that the subsequently described event or circumstance may or may not occur, and that the description includes instances where the event or circumstance occurs and instances where it does not.

Figure 1:
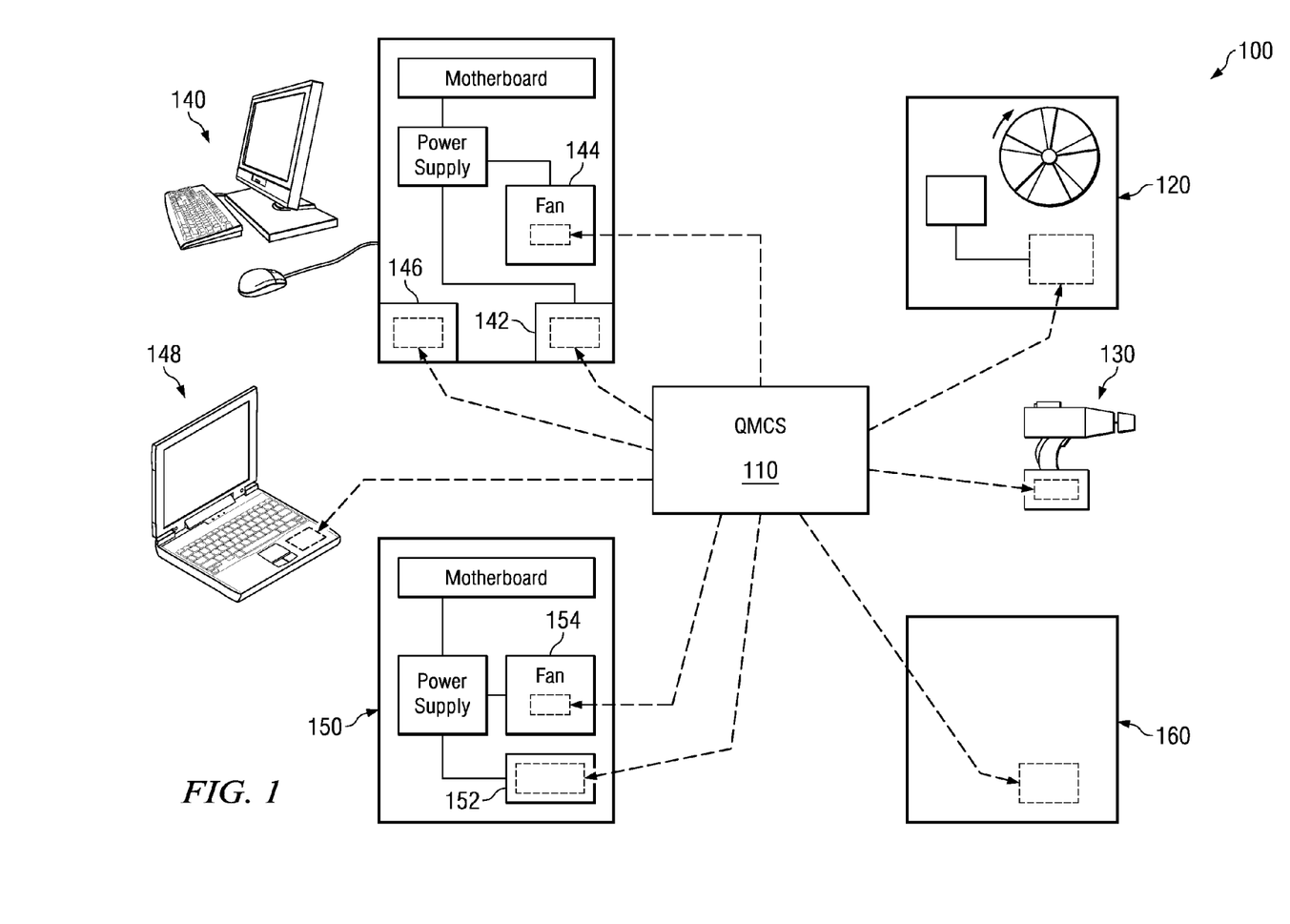
FIG. 1 is an environmental drawing illustrating environments that may utilize the quiet motor control system (QMCS).

FIG. 1 is an environmental drawing 100 illustrating a few environments that may utilize the quiet motor control system (QMCS) 110. This system digitally determines modulated voltages applied to motor phases in a manner that compensates for winding torque distortions, which reduces acoustic emissions. By reducing acoustic emissions, or noise, the QMCS 110 may be used in a host of minimal noise environments. For example, an electric fan 120, such as a house fan, may include the QMCS 110. Similarly, a cordless drill 130 and a computer system 140 may also include this system. In fact, the computer system 140 may include a hard disk drive 142, fan 144, and data storage drive 146, such as a DVD drive, CD drive, or the like. The QMCS 110 may be included either one or more of the hard disk drive 142, fan 144, and data storage drive 146. Similarly, this system may be included within a laptop 148 or a set top box 150. Within the set top box 150 the QMCS 110 may be associated with either a hard disk drive 152 or a fan 154. The element 160 may also include the QMCS 110; this element represents any environment that has a rotating machine. Examples of the element 160 may include a camcorder, automobile's navigation system, and the like.

Figure 2A:
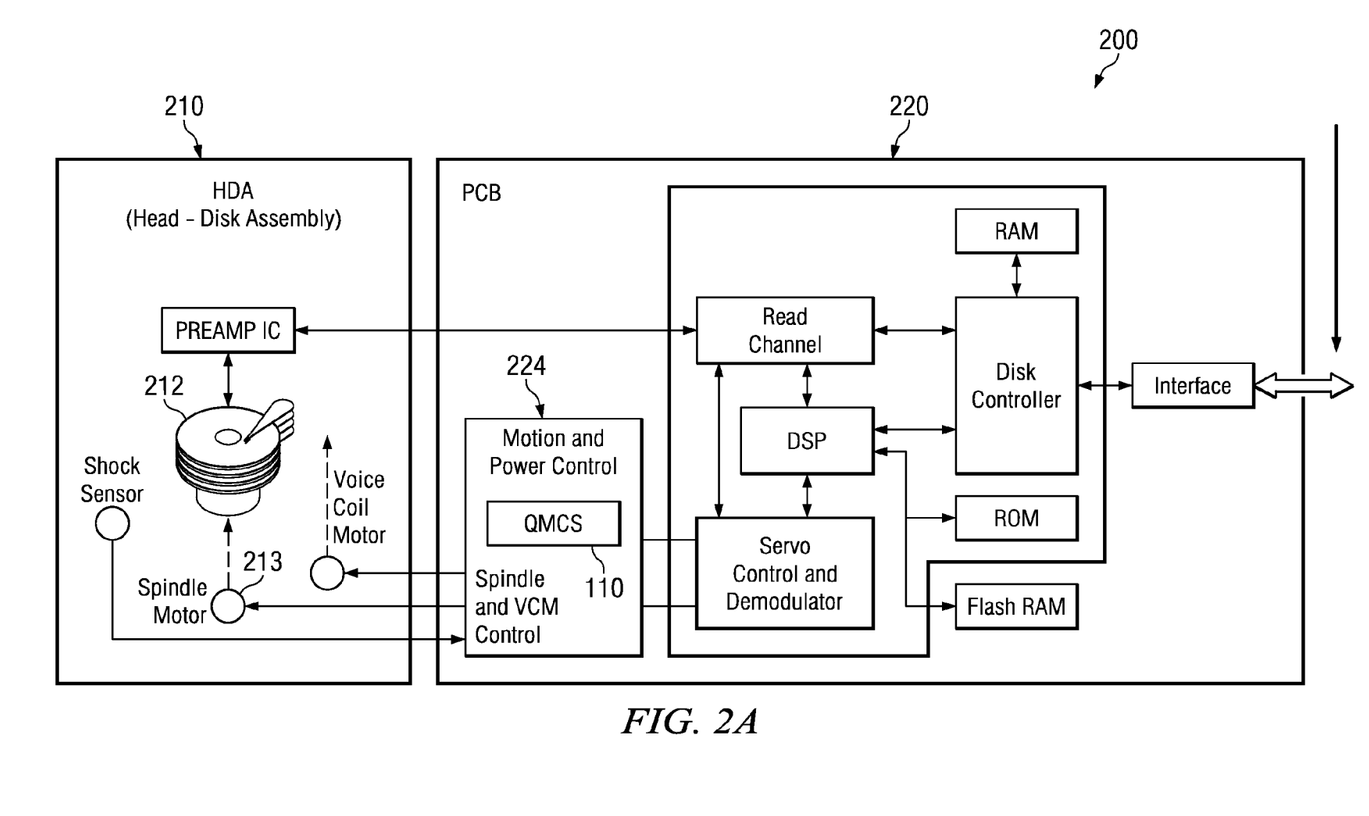
FIG. 2A is a block diagram illustrating components within a hard disk drive that includes the QMCS.

FIG. 2A is a block diagram illustrating components within a hard disk drive 200 that includes a QMCS 110. This hard disk drive has a head disk assembly 210 that has magnetic platters 212 for storing data within the hard disk drive 200. A spindle motor 213 rotates the platters, which facilitates the writing and reading of data. The hard disk drive 200 also includes a printed circuit board 220. On this board, there may be a servo control and a motion and power control block 224 that includes the QMCS 110. In an alternative implementation, the QMCS 110 may be divided into various components that may be located throughout the hard disk drive 200.

Figure 2B:
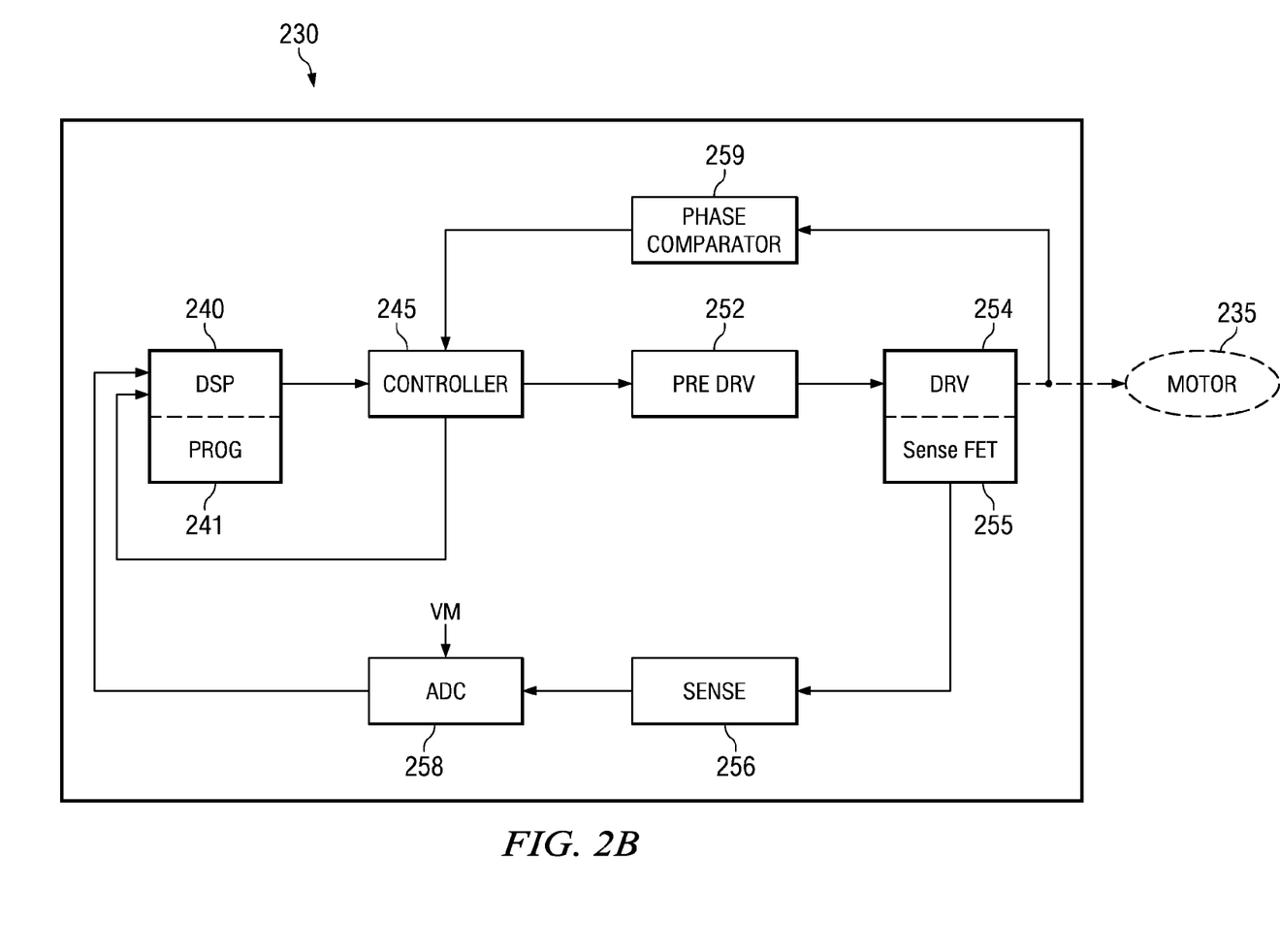
FIG. 2B is a block diagram of the QMCS associated with a motor, such as the motor of FIG. 2A.

FIG. 2B is a block diagram 230 of the QMCS 110 associated with the motor 235. As mentioned above the QMCS 110 may be used with any type of rotating machine, such as a motor. In some implementations, the motor 235 may be either a single phase or a multi-phase motor with varying numbers of commutation states. For example, the motor 235 may be a three-phase, brushless DC motor with six commutation states that rotates the platters in a hard disk drive. In an alternative implementation, the motor 235 may be a brushed motor, another type of brushless DC motor, an induction motor, or the like.

As shown, the diagram 230 includes a digital signal processor (DSP) 240 and a controller 245. The DSP 240 may be any kind of DSP or microcontroller (MCU) such as TMS320C55X, MSP430, or the like. As illustrated, this DSP may store and execute instructions, or a program 241, for a power control algorithm used by the QMCS 110. This algorithm acts to maintain constant power delivered to the motor the power which in turn reduces the torque ripple produced in the motor and helps to reduce acoustic emissions. The diagram 230 also includes a controller 245 that generates interrupts for the DSP 240 to periodically initiate updates to the power control algorithm. This controller also controls the timing signals for sampling and digitizing the motor phase currents and power supply voltage and it converts the power control loops output command into duty cycle based waveforms that can be applied to each of the 3 motor phases via the PRE DRV 252. Finally, the controller 245 may be any kind of controller dedicated to a specific function, such as an application specific integrated circuit (ASIC), field programmable gate array (FPGA), or the like. In an alternative implementation, the function of the DSP 240 and the controller 245 may be combined into one, such as a DSP, complex controller, or the like.

The diagram 230 also includes a few other components that collaboratively work with the DSP 240 and the controller 245. A pre-drive block (Pre DRV) 252 generates gate signals from digital input commands from the controller 245. These gate signals can switch powered devices within the drive block (DRV) 254. This block may include power field effect transistors (FET) that apply voltages and deliver currents to phases of the motor 235. The drive block 254 may also include current sensing FETs 255 that enable measuring motor phase currents without in-line current sense elements. A sense block (SENSE) 256 conditions signals from the integrated current sense FETs 255. This conditioning generates voltages that are suitable for conversion in the analog to digital converter block (ADC) 258. The ADC converts signals representing motor phase currents and power supply voltage into digital values usable by the DSP 240. Finally, the phase comparator 259 monitors the motor's voltages and identifies phase information sent to the controller 245. In response, this controller may send an interrupt to the DSP 240, such that it can control the commutation of the motor 235.

The architecture of the QMCS 110 including the diagram 230 enables optimal current wave shaping that reduces acoustic emissions resulting from electrically induced torque ripple. Torque ripple, or any deviation from a nominal amount of torque, can produce distracting acoustics. Since applied voltages may serve as the cause of torque ripple, QMCS 110 digitally determines the modulated voltages applied on each phase and adapts voltages in a way that compensate for distortions in the motor's winding torque; thus, acoustic emissions are reduced.

The QMCS 110 is effective because it takes advantage of the relationship between power and torque. $P_{delivered}$ is the power delivered to the motor; $P_{effective}$ is the effective power that produces motor torque, while $P_{lost}$ is the power lost through heat dissipation. The following equations highlight this relationship:

$$Pdelivered = Plost + Peffective$$

$$Pdelivered = Vdmtr \cdot Imtr$$

$$Pdelivered = Lmtr \cdot Imtr \cdot \left(\frac{d}{dt} Imtr\right) + Imtr^2 \cdot Rmtr + Imtr \cdot Eg$$

$$Plost = Lmtr \cdot Imtr \cdot \left(\frac{d}{dt} Imtr\right) + Imtr^2 \cdot Rmtr$$

$$Peffective = Imtr \cdot Eg$$

$$Eg = Ke \cdot \omega$$

$$Eg = Kt \cdot \omega$$

$$Peffective = Imtr \cdot Kt \cdot \omega$$

$$Tau = Imtr \cdot Kt$$

$$Peffective = Tau \cdot \omega$$

In these equations, $V_{dmtr}$=drive voltage across the motor, $I_{mtr}$=current through the motor, $L_{mtr}$=inductance through the motor, $R_{mtr}$=resistance across the motor, and $E_g$=back emf voltage of the motor. Ke is the back electro-motive force constant, Kt is the torque constant, Tau is the motor's torque, and $\omega$ is the motor's rotational speed. Often, the effective power Peffective, is much greater than the lost power Plost. When that is true, one can derive the following relationship:

$$Pdelivered \approx Tau * \omega$$

$$Tau \cong \frac{Pdelivered}{\omega}$$

The torque generated in the motor is equal to the power delivered to the motor divided by the motor's rotational speed. Hence, maintaining a constant delivered power for a constant rotational speed means that the generated torque will be constant. A constant torque produces less acoustic noise because the torque ripple is constant. The QMCS 110 effectively controls the motor so constant power is delivered and torque ripple is reduced. This system produces pulse width modulated voltages for each motor phase. The phasing of these applied voltages is maintained by using a control scheme that derives commutation timing from zero crossings for the back electromotive (BEMF) voltage. Other methods could also be used to maintain the phasing of the applied voltages but it is always desirable to apply the voltages such that the motor's phase current is in phase with it's torque function (represented by it's BEMF voltage).

Figure 3A:
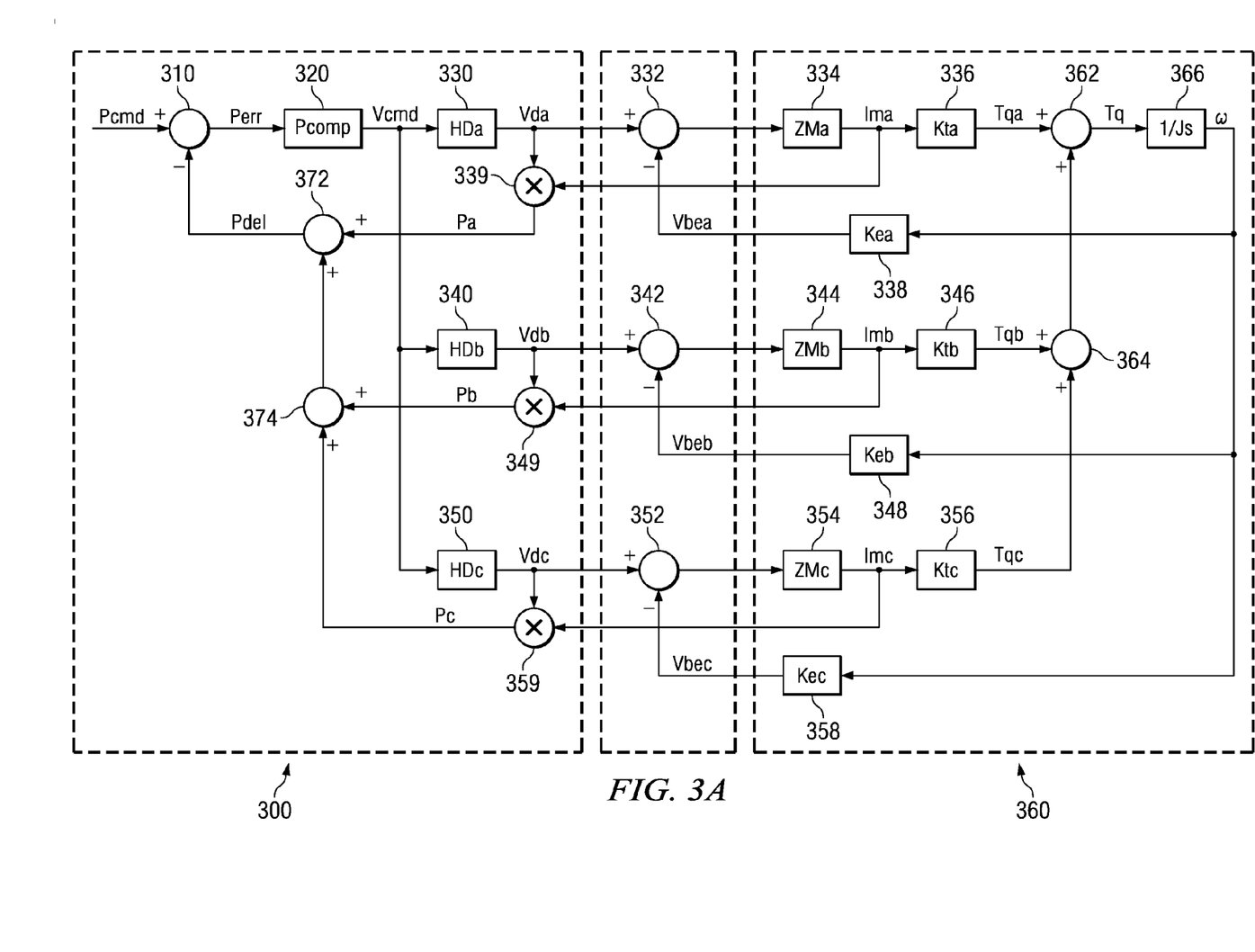
FIG. 3A is a block diagram 300 of a first implementation of the QMCS.

FIG. 3A is a block diagram 300 of a first implementation of the QMCS 110. A user may request a desired power to be delivered to the motor; this requested power is denoted $P_{cmd}$. A element 310 receives the commanded power $P_{cmd}$ signal and the delivered power signal, denoted $P_{del}$. This element produces an error signal reflective of how the commanded power $P_{cmd}$ signal relates to the delivered power $P_{del}$ signal. For example, the element 310 may produce the error signal $P_{err}$ by subtracting the delivered power $P_{del}$ signal from the commanded power $P_{cmd}$ signal. A compensation block 320 receives the error signal $P_{err}$ and produces a command voltage $V_{cmd}$ signal. In producing the command voltage $V_{cmd}$ signal, the compensation block 320 compensates this power control loop in order to produce desired loop transfer characteristics, such as stability, minimum steady state error, and the like. The command voltage $V_{cmd}$ signal enables adjustment of the magnitude of respective phase voltages. For example, this command voltage signal enables determination of how a magnitude of a first phase voltage should vary in light of the command voltage $V_{cmd}$ signal.

Transform blocks 330, 340, and 350 each receive the command voltage $V_{cmd}$ signal. Each of these transform blocks transforms the command voltage into a voltage suitable for driving one or more phases associated with the motor 360. For example, the motor 360 is shown as a three phase motor, though the QMCS 110 may be used with a motor with any number of phases. In addition, the number of transform blocks in a given implementation may reflect the number of phases associated with the motor 360. For example, the QMCS 110 may include two transform blocks if the motor 360 has two phases.

Figure 3B:
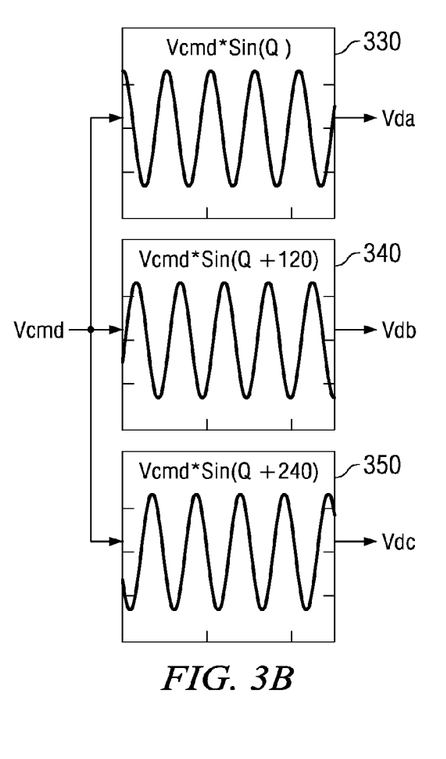
FIG. 3B is a graphical representation of an implementation of the transform blocks of FIG. 3A.

In the implementation shown in FIG. 3A, the motor 360 has three phases and there are three transform blocks 330, 340, and 350. Since the QMCS 110 reduces acoustic emission by reducing torque ripple, this system maintains constant torque. To facilitate this, these transform blocks determine how the torque gets distributed among the three phases a, b, and c. FIG. 3B is a graphical representation of an implementation of the transform blocks 330, 340, and 350. For example, the transform block 330 produces a phase a drive voltage $V_{da}$ signal. As illustrated, this voltage signal may be characterized by the following formula: $V_{da}=V_{cmd}*Sin(\theta)$. Similarly, the phase b drive, voltage $V_{db}$ signal from the transform block 340 and the phase c drive voltage $V_{dc}$ signal from the transform block 350 may be characterized by the following formulas: $V_{db}=V_{cmd}*Sin(\theta+120)$; and $V_{dc}=V_{cmd}*Sin(\theta+240)$. Here, $\theta$ represents the angular position of the voltages applied to the motor. It is desirable for the applied voltages to be applied such that the phase of the resulting currents is aligned with the motor's torque function or bemf voltage. This is typically controlled by the motor commutation control circuit.

Returning to FIG. 3A, elements may receive the drive voltage signals from each transform block. For example, a element 332 and element 339 both receive the phase a drive voltage signal $V_{da}$. In the implementation illustrated in FIG. 3A, the element 332 may be a physical summing node, while the element 339 may be a multiplier. The element 332 transmits a summed voltage signal for phase a to the impedance element 334; which may represent the motor's impedance for phase a. This impedance element transmits a phase a motor current signal $I_{ma}$ that the element 339 receives along with a torque transform block 336. The torque transform block 336 has an associated torque constant $K_{ta}$ and transmits a phase a torque signal $T_{qa}$, which represents the torque in phase a. Because element 339 receives the phase a motor current signal $I_{ma}$ and phase a drive voltage signal $V_{da}$, the element 339 produces a phase a power signal $P_a$ associated with the power in phase a. A element 338 has an associated phase a electromotive force (emf) constant $K_{ea}$ and receives the motor's velocity signal $\omega$. This element produces a phase a back emf voltage signal $V_{bea}$. Like phase a 332-339, elements 342-349 and elements 352-359 collaboratively produce a phase torque signal and a phase power signal for phase b and phase c respectively. For example, the elements 342-349 produce a phase b torque signal $T_{qb}$ and phase b power signal $P_b$. Similarly, the elements 352-359 produce a phase c torque signal $T_{qc}$ and the phase c power signal $P_c$.

Element 362 and element 364 receive the phase torque signals. More specifically, element 364 transmits a first combined torque signal by combining the phase b torque signal $T_{qb}$ and the phase c torque signal $T_{qc}$. In one implementation, the element 364 combines these signals by adding, though other implementations are possible. Similarly, the element 362 transmits a second combined torque signal by combining the phase a torque signal $T_{qa}$ and the phase b torque signal $T_{qb}$. While the element 362 combines these signals by adding, other implementations are possible. This second combined torque signal may represent the motor's total torque signal $T_q$. A velocity transform block 366 receives the motor's total torque signal $T_q$ and produces the motor's velocity signal $\omega$.

Finally, element 372 and element 374 receive the phase power signals. More specifically, element 374 transmits a first combined power signal by combining the phase b power signal $P_b$ and the phase c power signal $P_c$. In one implementation, the element 374 combines these signals by adding, though other implementations are possible. Similarly, the element 372 transmits a second combined power signal by combining the phase a power signal $P_a$ with the phase b power signal $P_b$ and the phase c power signal $P_c$. While the element 362 combines these signals by adding, other implementations are possible. This second combined power signal may represent the motor's total delivered power signal $P_{del}$. As mentioned above, the element 310 may determine an error power signal $P_{err}$ using the difference between this delivered power signal and a commanded power signal $P_{cmd}$.

Figure 3C:
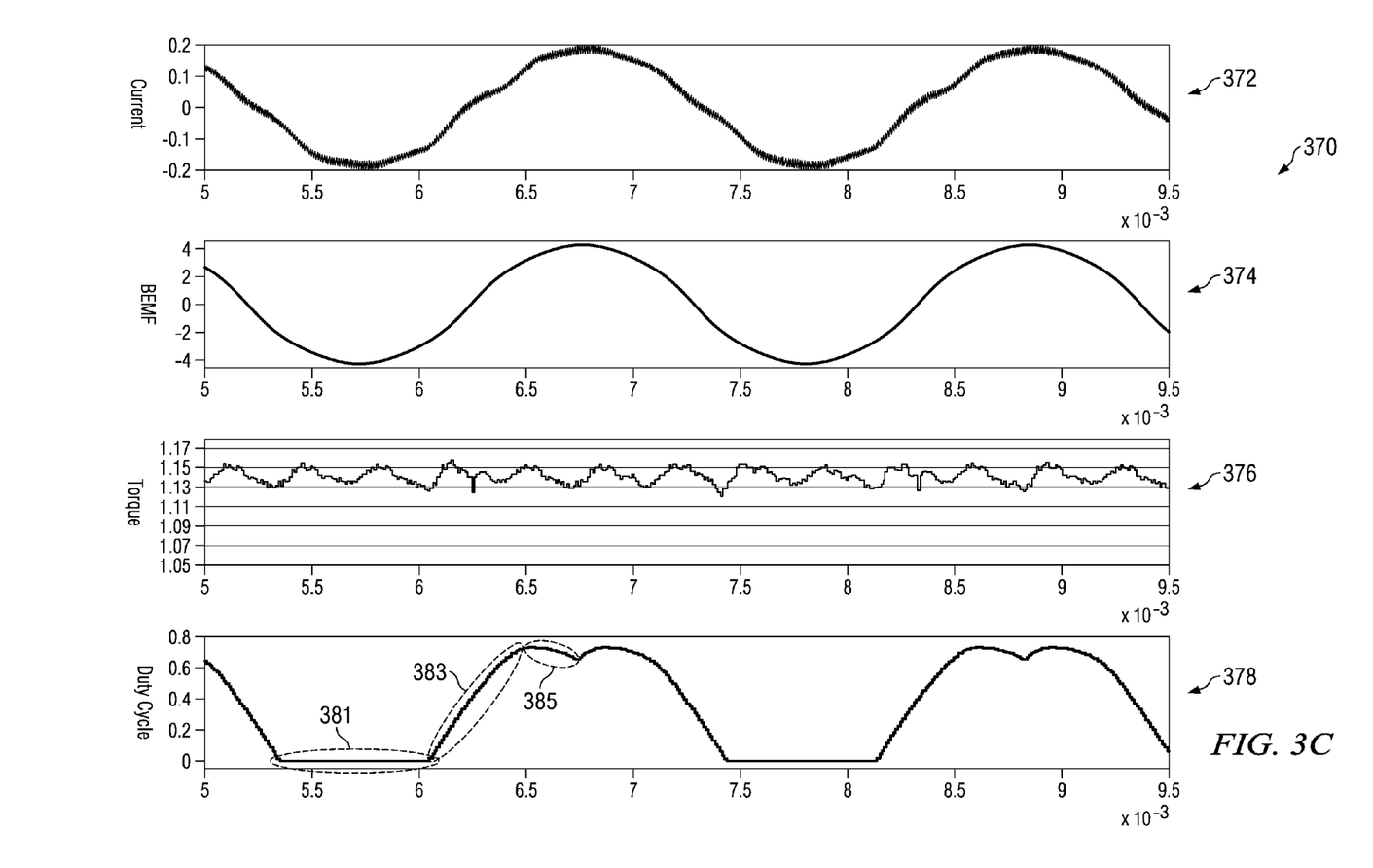
FIG. 3C is a graphical representation illustrating the effectiveness of the QMCS.

Using the components in the block 300, the QMCS 110 can adjust voltages applied to the motor's phases in light of user-requested commanded power so that the system's power remains constant, which reduces torque ripple. FIG. 3C is a graphical representation 370 illustrating the effectiveness of the QMCS 110. The curve 374 illustrates the motor's back emf voltage for a single phase. It includes distortion that can result from typical non-idealities; this distortion can create torque ripple that will produce acoustic emission, or noise. The curve 378, demonstrates how the duty cycle on a single phase is varied in the QMCS system. This duty cycle curve has a first region 381 that may be considered a ground region, a second region 383 that may be considered a sloped region, and a third region 385 that may be considered a capped region. The current curve 372 demonstrates the motor's current that results when the voltage represented by 378 is applied to the phase whose bemf is represented by 374. The curve 276 represents the total torque produced in the motor by combining the product of each of the motor's phase currents (370) with it's respective torque function (essentially represented by 374). It demonstrates that despite the distortions that are present because of motor non-idealities the QMCS 110 keeps the torque fairly constant without any appreciable torque ripple.

To implement the block 300 (see FIG. 3A) that produces the duty cycle curve 378 with the desired torque characteristics, the QMCS 100 uses a system of equations that may be implemented by a microprocessor digital signal processor (e.g., DSP 240), or the like. Since the motor 360 (see FIG. 3B) is a three-phased motor, the sum of three currents associated with the motor's phases must be zero. More specifically, $I_a+I_b+I_c=0$, where $I_a$ is the current in phase a, while $I_b$ is the current in phase b, and $I_c$ is the current in phase c. For this implementation, one of the motor's phases is held at ground, while a voltage is applied on the other two phases. The applied voltages on each of the three phases is such that at any given time one phase will be held at ground and the current on this phase can be represented as Ignd while the second phase will receive a voltage relating to the duty cycle represented in region 383. The current on the second phase can be represented as Islope. The third phase will receive a voltage relating to the duty cycle as represented in region 385 and the current on this phase can be represented as Icap. Using these facts, the current in the third phase may be calculated as follows: $I_{slope}=(I_{gnd}+I_{cap})$. Hence, knowing the current in two of the phases enables calculation of the current in the third phase.

After determining how to acquire the current for the three phases, the delivered power $P_{del}$ may be calculated. The motor's delivered power $P_{del}$ is the sum of the power in each of the motor's phases. In other words, the delivered power $P_{del}$ may be governed by $P_{del}=P_a+P_b+P_c$. With this relationship established, the delivered power $P_{del}$ may be calculated as shown below.

$$P_a = ADC_{I_{Cap}} * ADC_{V_{Supply}} * DC_{Cap},$$

where $ADC_{I_{Cap}}$ is the digital word represented by the conversion of the motor's phase whose applied voltage is represented as 385, $ADC_{V_{Supply}}$ is the digital word represented by the conversion of the power supply voltage, and $DC_{Cap}$, is the duty cycle of the applied voltage on the motor's phase whose applied voltage is represented by 385.

$$P_b = ADC_{I_{Gnd}} * ADC_{V_{Supply}} * 0,$$

where $ADC_{I_{Gnd}}$ is the digital word represented by the conversion of the motor's phase whose applied voltage is held at ground.

$$P_c = (ADC_{I_{Cap}} - ADC_{I_{Gnd}}) * ADC_{V_{Supply}} * DC_{Slope},$$

where $DC_{Slope}$ is the duty cycle of the applied voltage on the motor's phase whose applied voltage is represented by 383__

$$P_{del} = P_a + P_b + P_c = P_a + 0 + P_c = P_a + P_c$$

$$P_{del} = (ADC_{I_{Cap}} * ADC_{V_{Supply}} * DC_{Cap}) + ((ADC_{I_{Cap}} - ADC_{I_{Gnd}}) * ADC_{V_{Supply}} * DC_{Slope})$$

To determine the values for $ADC_{I_{Cap}}$, $ADC_{V_{Supply}}$, $DC_{Cap}$, $ADC_{I_{Gnd}}$, $DC_{Slope}$, the DSP 240 or the controller 245 may include a look up table that contains the duty cycle of the applied voltage or by performing an analog to digital conversion of the motor's phase currents In order to generate the duty cycle waveforms like those shown in the curve 378 the DSP 240 executes the following equations to determine the duty cycle to be applied to the phase whose voltage is to be applied as illustrated by 383 (DCslope) as well as the duty cycle to be applied to the phase whose voltage is to be applied as illustrated by 385 (DCcap). To facilitate that process the following equations are used:

$$P_{err} = P_{cmd} - P_{del}$$

$$P_{int} = P_{int\_old} + KI * P_{err},$$

where $P_{int}$ represents the integral portion of the compensation applied by compensation block 320 and $P_{int\_old}$ represents the integral value from the previous sample and KI gain of the integral part of the compensation.

$$P_{cmd} = KP * P_{err} + P_{int},$$

where KP is the gain of the proportional part of the compensation.

$$DC_{cap} = P_{cmd} * Cap[PWM_{State}],$$

where $Cap[PWM_{State}]$ is the value from a look up table that represents a unit version of the duty cycles that represents the torque distribution transform as illustrated in FIG. 3B for the phase whose voltage is to be applied as illustrated by 385 $DC_{Slope} = P_{cmd} * slope[PWM_{State}]$, where $slope[PWM_{State}]$ is the value from a look up table that represents a unit version of the duty cycles that represents the torque distribution transform as illustrated in FIG. 3B for the phase whose voltage is to be applied as illustrated by 383__

The Controller 245 uses the values of DCcap and DCslope to generate signals suitable for driving the power FETs in DRV such that the duty cycles of the applied voltages on the motor phases will look like the signal illustrated in 378.

Figure 4A:
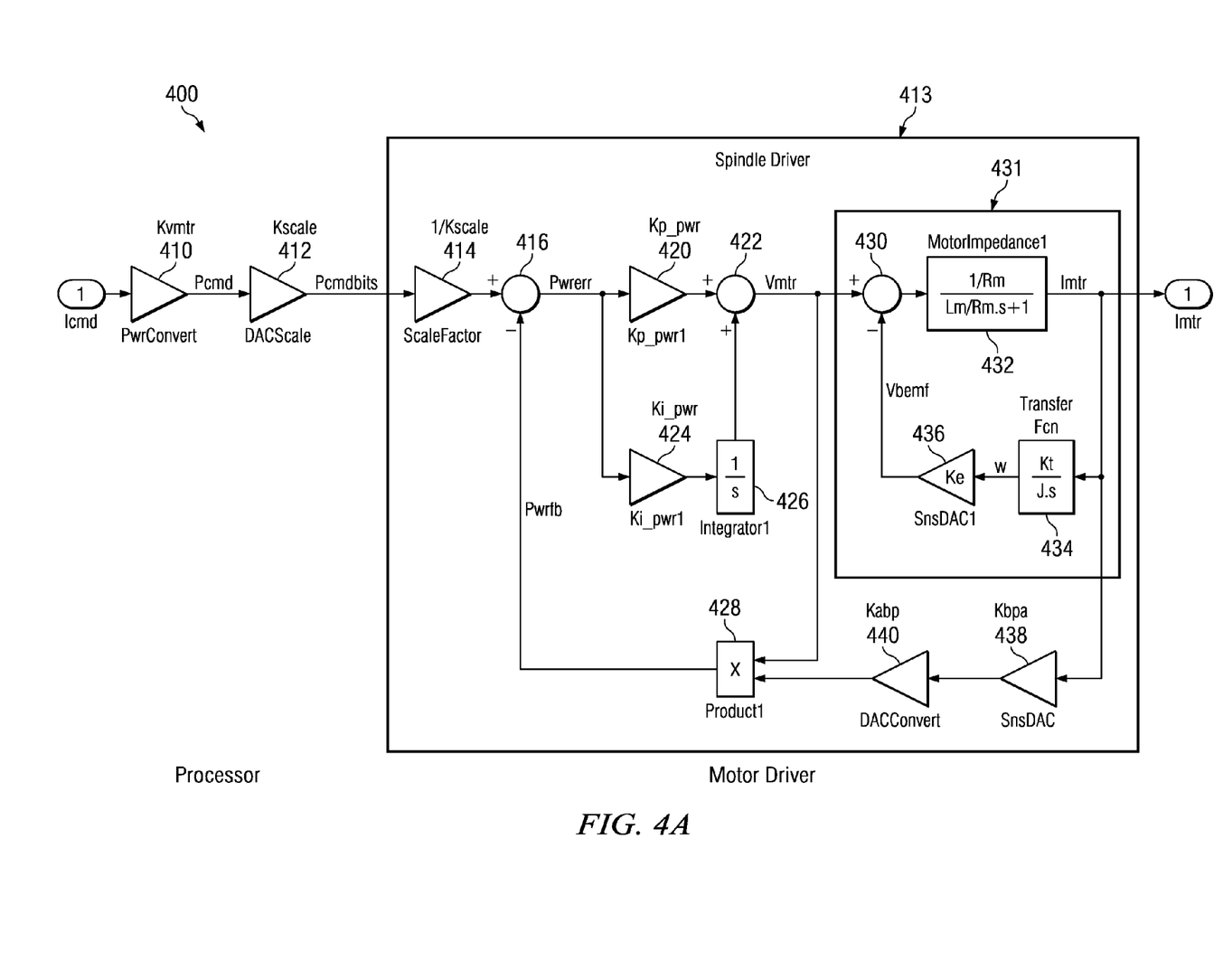
FIG. 4A is a block diagram illustrating the transform from a programmed Icmd to the resulting current in the motor (Imtr) in a system that is implementing the QMCS.

Turning now to FIG. 4A, this figure is a block diagram of a simplified representation of the QMCS system. It includes a simplified DC motor representation of the 3 phase BLDC and illustrates the transformation from a requested Icmd to the resulting motor current Imtr.

Figure 4B:
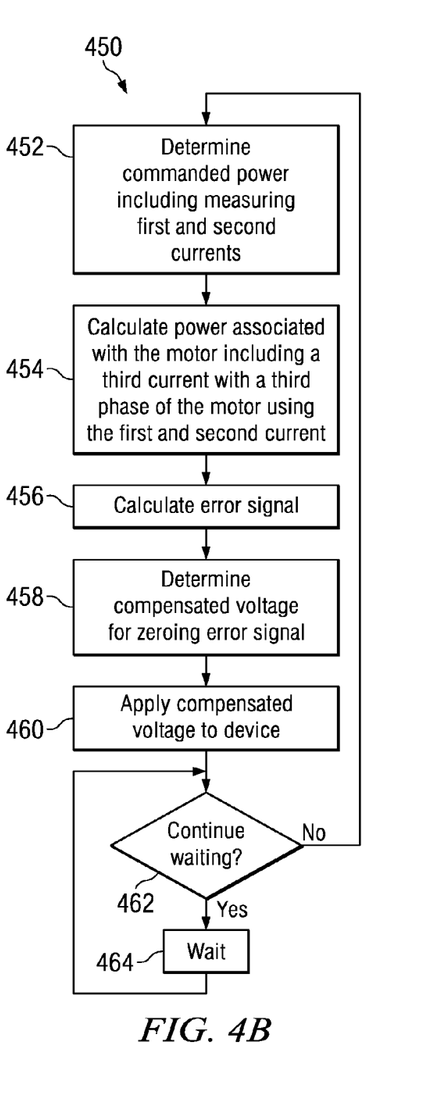
FIG. 4B is a flow chart illustrating blocks in a device-implemented method for the QMCS.

FIG. 4B is a flow chart 400 illustrating blocks in a device-implemented method for the QMCS 110. This device-implemented method may be implemented within software as an ordered listing of executable instructions for implementing logical functions that can be embodied in any computer-readable medium. This medium may be for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example, but, not limited to, an electronic, magnetic, optical, electromagnetic, infrared, or semiconductor system, apparatus, device, or propagation medium. More specific examples (a non-exhaustive list) of the computer-readable medium can include the following: an electrical connection (electronic) having one or more wires, a portable computer diskette (magnetic), a random access memory (RAM), a read-only memory (ROM), an erasable programmable read-only memory (EPROM or Flash memory) (magnetic), an optical fiber (optical), and a portable compact disc read-only memory (CDROM) (optical). Note that the computer-readable medium can even be paper or another suitable medium upon which the program is printed. The program can be electronically captured, via for instance optical scanning of the paper or other medium, then compiled, interpreted or otherwise processed in a suitable manner if necessary, and then stored in a computer memory.

In block 452, the method determines the commanded power. Returning to FIG. 4A, this may involve identifying converting a received command current to a commanded power as done by the power converter element 410. In an alternative implementation, the commanded power may be received directly through a user interface. Another alternative implementation may combine elements 410-414, such that determining the commanded power also involves digital to analog conversion and scaling.

Block 452 is followed by block 454. In this block, a power associated with the machine is calculated. A power associated with the machine may include any one or more of the following powers: delivered power, lost power, and effective power. Calculating a delivered power may include measuring currents, such as phase current, associated with the motor, or rotating machine. Some examples of these currents may be phase currents. In addition, this block may also include calculating the product of measured currents and stored values for applied voltages as described with reference to FIGS. 2B-3C. In FIG. 4A, element 423 also determines the delivered power, which is a product of the voltage applied to the motor and the resulting current in the motor.__ If block 454 involves calculating an effective power, elements 532-563 of FIG. 5 determine the effective power. The methods involved in calculating effective power are described in greater detail with reference to FIG. 5.

Block 454 is followed by block 456. In this block, an error signal is calculated. Element 416 of FIG. 4A generally involves calculating this error signal; similarly element 310 in FIG. 3A is associated with this calculation. This calculation generally involves creating an error signal reflective of the relationship between the power commanded and the power delivered. In one implementation, this may be done by subtracting the delivered power from the commanded power.

Block 456 is followed by block 458, which determines a compensated voltage for substantially zeroing the error signal. To accomplish, proportional and integral compensation may be used. Elements 420, 424, and 426 in FIG. 4A generally involve determining this voltage. More specifically, element 420 relates to proportional compensation, while the other elements relate to integral compensation. In an alternative implementation, another type of compensation such as proportional (P), proportional plus integral plus derivative (PID), lead, lag, etc. may be used. Other sections described with reference to FIGS. 2B-3C also relate to determining the compensated voltage that substantially zeros the error signal.

In block 460, the compensated voltage is applied to the device. This may generally involve utilizing one or more of the predrive block 252, drive block 254, and sense block 256 described with reference to FIG. 2B. In addition, elements 362-366 of FIG. 3A and elements 430-431 of FIG. 4A generally relate to applying the compensated voltage to the device. When the device is a multi-phase motor, this may involve applying the appropriate compensated voltages to different phases of the motor.

After block 460, the decision block 462 determines whether waiting should continue. In one implementation, a user may define a frequency for pulse width modulation (PWM), such that the threshold for this block may be related to that frequency. For example, the wait may continue until a PWM cycle has passed. If that has not occurred, the "yes" branch may be followed to block 464 and the waiting continues. Otherwise, the "no" branch may be followed back to block 452 and the flow repeats. Numerous alternative implementations may occur by using any number of conditions for the decision block 462.

Finally, the order of the blocks in the flow chart 400 is for illustrative purposes only. Some blocks may be executed in a different order. One or more of the blocks in the flow chart 400 may be executed in parallel. Any of these variations represent merely an alternative implementation to the device-implemented method for the QMCS 110.

Figure 5:
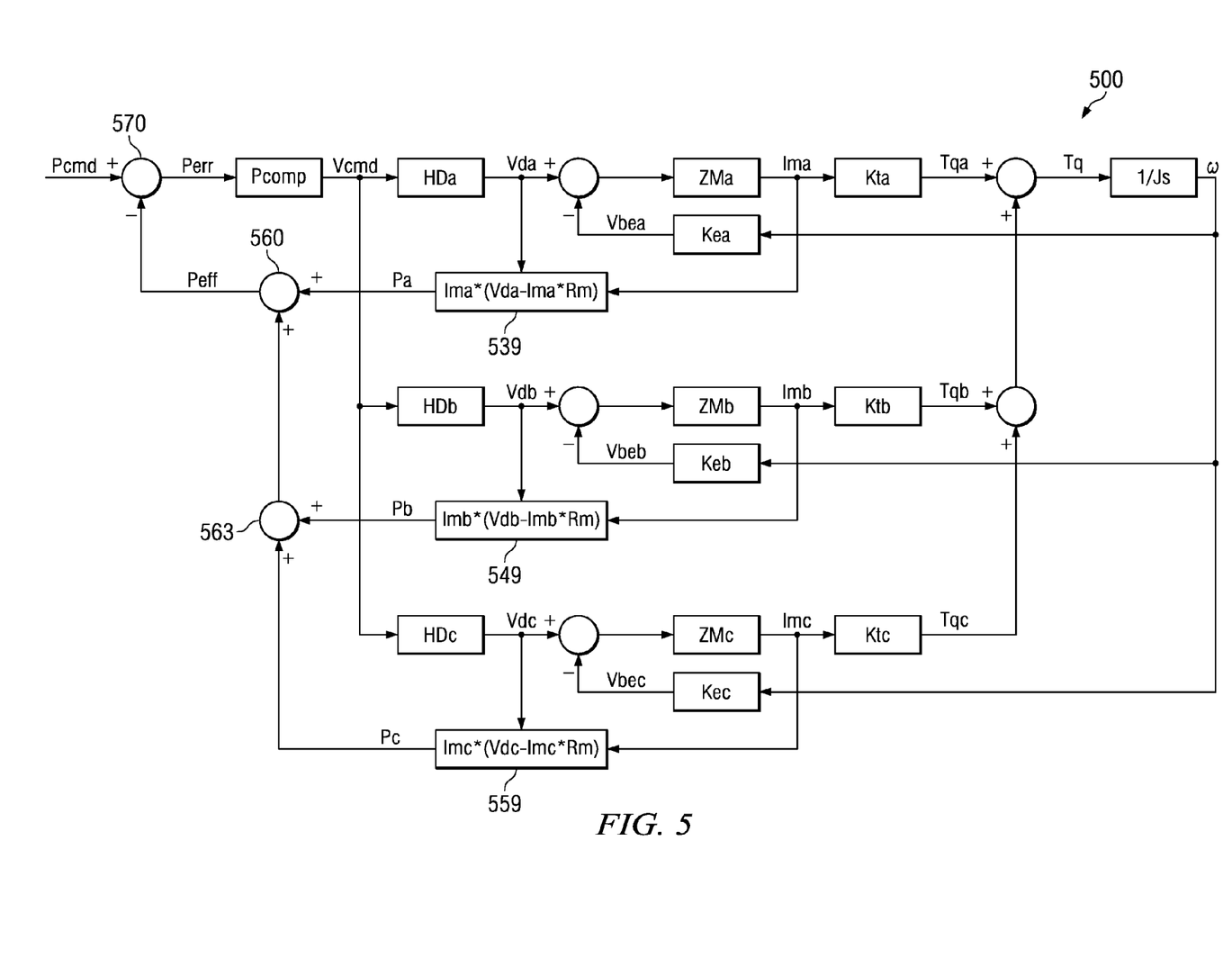
FIG. 5 is a block diagram of an alternative implementation of the QMCS.

FIG. 5 is a block diagram 500 of an alternative implementation of the QMCS 110. In this implementation, blocks 539, 549 and 559 produce the associated phase powers instead of the multipliers described with reference to FIG. 3A. Block 539 enables determination of the effective power $P_a$ associated with phase A as governed by the following equation:

$$P_a = I_{ma} * (V_{da} - I_{ma} * R_m),$$

where $R_m$ represents the resistance of the motor. This resistance $R_m$ may either be estimated or programmed by the user. Similarly, block 549 and block 559 enable determination of the effective power $P_b$ for phase B and the effective power $P_c$ for phase C, respectively.

Finally, element 560 and element 563 receive the phase power signals. More specifically, element 563 transmits a first combined power signal by combining the phase b power signal $P_b$ and the phase c power signal $P_c$. In one implementation, the element 563 combines these signals by adding, though other implementations are possible. Similarly, the element 560 transmits a second combined power signal by combining the phase a power signal $P_a$ with the phase b power signal $P_b$ and the phase c power signal $P_c$. While the element 560 combines these signals by adding, other implementations are possible. This second combined power signal may represent the motor's total effective power signal $P_{eff}$. The element 570 may determine an error power signal $P_{err}$ using the difference between this effective power signal and a commanded power signal $P_{cmd}$. Consequently, the total effective power $P_{eff}$ may be determined instead of the total delivered power $P_{del}$, as described with reference to FIG. 3A. This implementation can be used to further reduce torque ripple and acoustic noise that occurs as a result of assuming that Plost is much smaller than Peffective as is the case in the implementation of FIG. 3A.

While various embodiments of the quiet motor control system have been described, it may be apparent to those of ordinary skill in the art that many more embodiments and implementations are possible that are within the scope of this system. Although certain aspects of the quiet motor control system may be described in relation to specific techniques or structures, the teachings and principles of the present system are not limited solely to such examples. All such modifications are intended to be included within the scope of this disclosure and the present quiet motor control system and protected by the following claim(s).

The invention claimed is:

1. A device with a quiet motor control system associated with a motor, comprising:
    a processor for transmitting timing signals for sampling motor phase currents and motor phase voltages; and
    a driver coupled for receiving the timing signal and the duty cycle signals and operative for activating each phase of the motor,
    wherein the quiet motor control system determines modulated voltages applied to each phase in a manner that compensates for winding torque distortions, which reduces acoustic emissions,
    wherein the quiet motor control system maintains constant power, which creates essentially constant torque,
    wherein the quiet motor control system maintains a constant power by determining the difference between a commanded power signal and a delivered power signal.

2. The device of claim 1 wherein the timing signals and the duty cycle signals are associated with the modulated voltages.

3. The device of claim 1, wherein the device is selected from the group consisting of a computer system, electric fan, set-top box, drill, camcorder, and navigation system.

4. The device of claim 1, wherein the converter comprises a sense block and an analog to digital converter.

5. The device of claim 1, further comprising a phase comparator coupled to the processor and operative for transmitting to the processor motor update signals.

* * * * *